(12) United States Patent
Rhoads et al.

(10) Patent No.: US 8,391,851 B2
(45) Date of Patent: Mar. 5, 2013

(54) GESTURAL TECHNIQUES WITH WIRELESS MOBILE PHONE DEVICES

(75) Inventors: Geoffrey B. Rhoads, West Linn, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 1139 days.

(21) Appl. No.: 11/754,126

(22) Filed: May 25, 2007

(65) Prior Publication Data

US 2008/0009310 A1    Jan. 10, 2008

Related U.S. Application Data

(60) Division of application No. 09/758,532, filed on Jan. 10, 2001, now Pat. No. 7,224,995, which is a continuation-in-part of application No. 09/571,422, filed on May 15, 2000, now Pat. No. 6,947,571.

(60) Provisional application No. 60/163,332, filed on Nov. 3, 1999.

(51) Int. Cl.
*H04M 3/00* (2006.01)

(52) U.S. Cl. .................. 455/418; 455/414.4; 455/414.1; 386/260

(58) Field of Classification Search .................. 340/988; 455/88, 352, 56.1, 556.2, 557, 566, 569.1, 455/569.2, 550.1, 418, 556.1, 414.1–414.4; 701/213; 382/100, 103, 116, 154, 165, 181–191, 382/203, 204, 209, 216, 217, 232–253, 312–315; 358/1.1, 1.9, 3.28; 386/200, 248, 252, 260; 719/328, 329

See application file for complete search history.

(56) References Cited

U.S. PATENT DOCUMENTS 4,218,702 A * 8/1980 Brocard et al. ............... 348/144
4,323,242 A * 4/1982 Rosenfeld ................. 273/153 R (Continued)

FOREIGN PATENT DOCUMENTS

EP    1152592    11/2001
JP    10-063411    3/1998

(Continued)

OTHER PUBLICATIONS

Clayton, "McGraw-Hill Illustrated Telecom Dictionary", Second Edition, 2000.*

(Continued)

*Primary Examiner* — Patrick Edouard
*Assistant Examiner* — Ronald Eisner

(57) ABSTRACT

A user gestures with a wireless mobile phone device to control some aspect of its operation, or the operation of a remote system with which the device communicates. Application programs can solicit gestural information through a standardized set of interface protocols (e.g., API functions). One function, for example, solicits a running set of gesture data, and a complementary function discontinues the first function. Other functions solicit device movement data in particular directions. In some arrangements gesture data is sent by the wireless device to a remote system, which may issue a response that is dependent on the received gesture data. This response may also depend on other data obtained by the wireless device (e.g., obtained from an electronic or physical object, or sensed from the environment) and sent to the remote system. The wireless device may have different modes of interacting with users, to accommodate users with greater or lesser proficiency in gestural techniques. A variety of other features and arrangements are also detailed.

11 Claims, 1 Drawing Sheet

U.S. PATENT DOCUMENTS

| | | |
|---|---|---|
| 5,125,077 A | 6/1992 | Hall |
| 5,235,651 A | 8/1993 | Nafarieh |
| 5,296,690 A | 3/1994 | Chandler et al. |
| 5,301,222 A * | 4/1994 | Fujiwara ................. 455/564 |
| 5,450,490 A | 9/1995 | Jensen et al. |
| 5,465,401 A | 11/1995 | Thompson |
| 5,521,843 A | 5/1996 | Hashima et al. |
| 5,526,022 A | 6/1996 | Donahue et al. |
| 5,526,035 A * | 6/1996 | Lappington et al. .......... 725/136 |
| 5,534,917 A | 7/1996 | MacDougall |
| 5,563,988 A | 10/1996 | Maes et al. |
| 5,572,433 A * | 11/1996 | Falconer et al. ............... 700/127 |
| 5,574,804 A * | 11/1996 | Olschafskie et al. ......... 382/313 |
| 5,581,276 A | 12/1996 | Cipolla et al. |
| 5,586,182 A * | 12/1996 | Miyashita ..................... 379/413 |
| 5,594,469 A | 1/1997 | Freeman et al. |
| 5,602,566 A | 2/1997 | Motosyuku et al. |
| 5,673,316 A | 9/1997 | Auerbach et al. |
| 5,742,845 A | 4/1998 | Wagner |
| 5,757,360 A | 5/1998 | Nitta et al. |
| 5,761,686 A | 6/1998 | Bloomberg |
| 5,764,770 A | 6/1998 | Schipper et al. |
| 5,778,102 A | 7/1998 | Sandford, II et al. |
| 5,822,436 A | 10/1998 | Rhoads |
| 5,838,458 A * | 11/1998 | Tsai ............................ 358/402 |
| 5,857,038 A | 1/1999 | Owada et al. |
| 5,862,260 A | 1/1999 | Rhoads |
| 5,867,494 A * | 2/1999 | Krishnaswamy et al. .... 370/352 |
| 5,881,321 A * | 3/1999 | Kivolowitz ..................... 396/53 |
| 5,893,037 A | 4/1999 | Reele et al. |
| 5,900,608 A | 5/1999 | Iida |
| 5,915,027 A | 6/1999 | Cox et al. |
| 5,973,915 A * | 10/1999 | Evans ........................ 361/679.23 |
| 5,996,894 A * | 12/1999 | Yin et al. .................. 235/462.01 |
| 6,002,946 A | 12/1999 | Reber |
| 6,037,984 A * | 3/2000 | Isnardi et al. .............. 375/240.21 |
| 6,052,486 A | 4/2000 | Knowlton et al. |
| 6,058,304 A | 5/2000 | Callaghan et al. |
| 6,064,737 A | 5/2000 | Rhoads |
| 6,067,082 A | 5/2000 | Anmei |
| 6,072,494 A * | 6/2000 | Nguyen ........................ 715/863 |
| 6,083,353 A * | 7/2000 | Alexander, Jr. ............... 202/158 |
| 6,091,777 A * | 7/2000 | Guetz et al. ............. 375/240.11 |
| 6,111,954 A | 8/2000 | Rhoads |
| 6,115,028 A | 9/2000 | Balakrishnan |
| 6,115,482 A | 9/2000 | Sears |
| 6,122,403 A | 9/2000 | Rhoads |
| 6,125,172 A | 9/2000 | August |
| 6,128,010 A * | 10/2000 | Baxter et al. .................. 715/846 |
| 6,144,336 A * | 11/2000 | Preston et al. ............. 342/357.09 |
| 6,144,848 A * | 11/2000 | Walsh et al. ................... 455/419 |
| 6,151,208 A | 11/2000 | Bartlett |
| 6,160,899 A | 12/2000 | Lee et al. |
| 6,192,257 B1 | 2/2001 | Ray |
| 6,195,104 B1 | 2/2001 | Lyons |
| 6,201,554 B1 | 3/2001 | Lands |
| 6,201,901 B1 | 3/2001 | Zhou et al. |
| 6,222,465 B1 | 4/2001 | Kumar et al. |
| 6,229,924 B1 | 5/2001 | Rhoads et al. |
| 6,243,075 B1 | 6/2001 | Fishkin |
| 6,243,480 B1 | 6/2001 | Zhao et al. |
| 6,244,873 B1 | 6/2001 | Hill et al. |
| 6,249,226 B1 | 6/2001 | Harrison et al. |
| 6,249,606 B1 | 6/2001 | Kiraly et al. |
| 6,252,598 B1 | 6/2001 | Segen |
| 6,252,963 B1 | 6/2001 | Rhoads |
| 6,255,942 B1 | 7/2001 | Knudsen |
| 6,268,857 B1 | 7/2001 | Fishkin et al. |
| 6,278,781 B1 | 8/2001 | Rhoads |
| 6,292,674 B1 | 9/2001 | Davis |
| 6,297,805 B1 | 10/2001 | Adler |
| 6,297,838 B1 | 10/2001 | Chang |
| 6,298,176 B2 | 10/2001 | Longacre et al. |
| 6,304,313 B1 | 10/2001 | Honma |
| 6,307,949 B1 | 10/2001 | Rhoads |
| 6,310,962 B1 * | 10/2001 | Chung et al. ................. 382/100 |
| 6,311,214 B1 | 10/2001 | Rhoads |
| 6,315,740 B1 * | 11/2001 | Singh ............................ 600/595 |
| 6,317,609 B1 | 11/2001 | Alperovich et al. |
| 6,330,975 B1 | 12/2001 | Bunte |
| 6,347,290 B1 | 2/2002 | Bartlett |
| 6,366,680 B1 | 4/2002 | Brunk et al. |
| 6,369,794 B1 | 4/2002 | Sakurai |
| 6,381,341 B1 | 4/2002 | Rhoads |
| 6,385,329 B1 | 5/2002 | Sharma et al. |
| 6,400,272 B1 | 6/2002 | Holtzman |
| 6,400,376 B1 | 6/2002 | Singh |
| 6,408,082 B1 | 6/2002 | Rhoads et al. |
| 6,408,187 B1 | 6/2002 | Merriam |
| 6,408,331 B1 | 6/2002 | Rhoads |
| 6,411,275 B1 | 6/2002 | Hedberg |
| 6,421,070 B1 | 7/2002 | Ramos et al. |
| 6,424,725 B1 | 7/2002 | Rhoads et al. |
| 6,433,793 B1 | 8/2002 | Ootsuka |
| 6,435,737 B1 * | 8/2002 | Wise et al. ..................... 712/200 |
| 6,438,231 B1 | 8/2002 | Rhoads |
| 6,438,393 B1 | 8/2002 | Suuronen |
| 6,466,198 B1 | 10/2002 | Feinstein |
| 6,473,523 B1 | 10/2002 | Newman et al. |
| 6,487,301 B1 | 11/2002 | Zhao |
| 6,487,421 B2 * | 11/2002 | Hess et al. .................. 455/550.1 |
| 6,490,376 B1 | 12/2002 | Au et al. |
| 6,498,628 B2 | 12/2002 | Iwamura |
| 6,513,717 B2 | 2/2003 | Hannigan |
| 6,516,079 B1 | 2/2003 | Rhoads et al. |
| 6,522,770 B1 | 2/2003 | Seder et al. |
| 6,535,617 B1 | 3/2003 | Hannigan et al. |
| 6,542,824 B1 * | 4/2003 | Berstis ......................... 701/220 |
| 6,542,927 B2 | 4/2003 | Rhoads |
| 6,546,002 B1 * | 4/2003 | Kim ............................. 370/351 |
| 6,549,792 B1 * | 4/2003 | Cannon et al. ............. 455/550.1 |
| 6,553,129 B1 | 4/2003 | Rhoads |
| 6,556,185 B2 | 4/2003 | Rekimoto |
| 6,565,003 B1 | 5/2003 | Ma |
| 6,567,068 B2 | 5/2003 | Rekimoto |
| 6,567,101 B1 | 5/2003 | Thomas |
| 6,567,533 B1 | 5/2003 | Rhoads |
| 6,573,883 B1 | 6/2003 | Bartlett |
| 6,580,808 B2 | 6/2003 | Rhoads |
| 6,590,996 B1 | 7/2003 | Reed et al. |
| 6,597,817 B1 | 7/2003 | Silverbrook |
| 6,611,607 B1 | 8/2003 | Davis et al. |
| 6,614,914 B1 | 9/2003 | Rhoads et al. |
| 6,624,824 B1 | 9/2003 | Tognazzini |
| 6,628,326 B1 * | 9/2003 | Manico et al. ............ 348/211.12 |
| 6,636,249 B1 | 10/2003 | Rekimoto |
| 6,647,128 B1 | 11/2003 | Rhoads |
| 6,647,130 B2 | 11/2003 | Rhoads |
| 6,650,761 B1 | 11/2003 | Rodriguez et al. |
| 6,661,463 B1 * | 12/2003 | Geshwind ................. 348/384.1 |
| 6,674,919 B1 | 1/2004 | Ma et al. |
| 6,675,165 B1 | 1/2004 | Rothschild |
| 6,678,425 B1 | 1/2004 | Flores et al. |
| 6,681,028 B2 | 1/2004 | Rodriguez et al. |
| 6,681,029 B1 | 1/2004 | Rhoads |
| 6,687,345 B1 | 2/2004 | Swartz |
| 6,694,042 B2 | 2/2004 | Seder et al. |
| 6,694,043 B2 | 2/2004 | Seder et al. |
| 6,700,990 B1 | 3/2004 | Rhoads |
| 6,700,995 B2 | 3/2004 | Reed |
| 6,704,869 B2 | 3/2004 | Rhoads et al. |
| 6,718,046 B2 | 4/2004 | Reed et al. |
| 6,718,047 B2 | 4/2004 | Rhoads |
| 6,720,949 B1 | 4/2004 | Pryor |
| 6,721,440 B2 | 4/2004 | Reed et al. |
| 6,750,848 B1 | 6/2004 | Pryor |
| 6,751,320 B2 | 6/2004 | Rhoads |
| 6,760,463 B2 | 7/2004 | Rhoads |
| 6,763,123 B2 | 7/2004 | Reed et al. |
| 6,765,553 B1 | 7/2004 | Odamura |
| 6,766,036 B1 | 7/2004 | Pryor |
| 6,768,809 B2 | 7/2004 | Rhoads et al. |
| 6,775,392 B1 | 8/2004 | Rhoads |
| 6,798,894 B2 | 9/2004 | Rhoads |
| 6,813,366 B1 | 11/2004 | Rhoads |
| 6,844,871 B1 | 1/2005 | Hinckley et al. |
| 6,879,701 B1 | 4/2005 | Rhoads |

| Patent No. | Date | Inventor(s) |
|---|---|---|
| 6,917,724 B2 | 7/2005 | Seder et al. |
| 6,920,232 B2 | 7/2005 | Rhoads |
| 6,947,571 B1 | 9/2005 | Rhoads et al. |
| 6,956,564 B1 | 10/2005 | Williams |
| 6,968,057 B2 | 11/2005 | Rhoads |
| 6,975,746 B2 | 12/2005 | Davis et al. |
| 6,987,975 B1 * | 1/2006 | Irvin et al. ............... 455/456.1 |
| 6,988,202 B1 | 1/2006 | Rhoads et al. |
| 6,996,252 B2 | 2/2006 | Reed et al. |
| 7,003,731 B1 | 2/2006 | Rhoads et al. |
| 7,024,016 B2 | 4/2006 | Rhoads et al. |
| 7,027,614 B2 | 4/2006 | Reed |
| 7,035,427 B2 | 4/2006 | Rhoads |
| 7,044,395 B1 | 5/2006 | Davis et al. |
| 7,051,086 B2 | 5/2006 | Rhoads et al. |
| 7,054,465 B2 | 5/2006 | Rhoads |
| 7,062,069 B2 | 6/2006 | Rhoads |
| 7,065,261 B1 | 6/2006 | Horie |
| 7,095,871 B2 | 8/2006 | Jones et al. |
| 7,103,197 B2 | 9/2006 | Rhoads |
| 7,111,168 B2 | 9/2006 | Lofgren et al. |
| 7,111,170 B2 | 9/2006 | Hein et al. |
| 7,113,596 B2 | 9/2006 | Rhoads |
| 7,113,614 B2 | 9/2006 | Rhoads |
| 7,116,781 B2 | 10/2006 | Rhoads |
| 7,139,408 B2 | 11/2006 | Rhoads et al. |
| 7,143,949 B1 | 12/2006 | Hannigan |
| 7,158,654 B2 | 1/2007 | Rhoads |
| 7,164,780 B2 | 1/2007 | Brundage et al. |
| 7,171,016 B1 | 1/2007 | Rhoads |
| 7,174,031 B2 | 2/2007 | Rhoads et al. |
| 7,177,443 B2 | 2/2007 | Rhoads |
| 7,191,156 B1 | 3/2007 | Seder |
| 7,213,757 B2 | 5/2007 | Jones et al. |
| 7,224,819 B2 | 5/2007 | Levy et al. |
| 7,224,995 B2 | 5/2007 | Rhoads |
| 7,248,717 B2 | 7/2007 | Rhoads |
| 7,261,612 B1 | 8/2007 | Hannigan et al. |
| 7,305,104 B2 | 12/2007 | Carr et al. |
| 7,308,110 B2 | 12/2007 | Rhoads |
| 7,313,251 B2 | 12/2007 | Rhoads |
| 7,319,775 B2 | 1/2008 | Sharma et al. |
| 7,330,564 B2 | 2/2008 | Brundage et al. |
| 7,340,076 B2 | 3/2008 | Stach et al. |
| 7,362,781 B2 | 4/2008 | Rhoads |
| 7,369,678 B2 | 5/2008 | Rhoads |
| 7,377,421 B2 | 5/2008 | Rhoads |
| 7,391,880 B2 | 6/2008 | Reed et al. |
| 7,406,214 B2 | 7/2008 | Rhoads et al. |
| 7,412,072 B2 | 8/2008 | Sharma et al. |
| 7,424,131 B2 | 9/2008 | Alattar et al. |
| 7,427,030 B2 | 9/2008 | Jones et al. |
| 7,433,491 B2 | 10/2008 | Rhoads |
| 7,444,000 B2 | 10/2008 | Rhoads |
| 7,444,392 B2 | 10/2008 | Rhoads et al. |
| 7,450,734 B2 | 11/2008 | Rodriguez et al. |
| 7,460,726 B2 | 12/2008 | Levy et al. |
| 7,466,840 B2 | 12/2008 | Rhoads |
| 7,486,799 B2 | 2/2009 | Rhoads |
| 7,502,759 B2 | 3/2009 | Hannigan et al. |
| 7,502,937 B2 | 3/2009 | McKinley et al. |
| 7,508,955 B2 | 3/2009 | Carr et al. |
| 7,515,733 B2 | 4/2009 | Rhoads |
| 7,522,728 B1 | 4/2009 | Rhoads |
| 7,536,034 B2 | 5/2009 | Rhoads et al. |
| 7,537,170 B2 | 5/2009 | Reed et al. |
| 7,545,952 B2 | 6/2009 | Brundage et al. |
| 7,564,992 B2 | 7/2009 | Rhoads |
| 7,565,294 B2 | 7/2009 | Rhoads |
| RE40,919 E | 9/2009 | Rhoads |
| 7,587,602 B2 | 9/2009 | Rhoads |
| 7,602,978 B2 | 10/2009 | Levy et al. |
| 7,628,320 B2 | 12/2009 | Rhoads |
| 7,643,649 B2 | 1/2010 | Davis et al. |
| 7,650,009 B2 | 1/2010 | Rhoads |
| 7,653,210 B2 | 1/2010 | Rhoads |
| 7,657,058 B2 | 2/2010 | Sharma |
| 7,685,426 B2 | 3/2010 | Ramos et al. |
| 7,693,300 B2 | 4/2010 | Reed et al. |
| 7,697,719 B2 | 4/2010 | Rhoads |
| 7,711,143 B2 | 5/2010 | Rhoads |
| 7,715,446 B2 | 5/2010 | Rhoads |
| 7,738,673 B2 | 6/2010 | Reed |
| 7,747,038 B2 | 6/2010 | Rhoads |
| 7,751,588 B2 | 7/2010 | Rhoads |
| 7,751,596 B2 | 7/2010 | Rhoads |
| 7,756,290 B2 | 7/2010 | Rhoads |
| 7,760,905 B2 | 7/2010 | Rhoads et al. |
| 7,762,468 B2 | 7/2010 | Jones et al. |
| 7,778,442 B2 | 8/2010 | Sharma et al. |
| 7,787,653 B2 | 8/2010 | Rhoads |
| 7,792,325 B2 | 9/2010 | Rhoads et al. |
| 7,822,225 B2 | 10/2010 | Alattar |
| 7,837,094 B2 | 11/2010 | Rhoads |
| 7,945,781 B1 | 5/2011 | Rhoads |
| 2001/0001854 A1 | 5/2001 | Schena et al. |
| 2001/0010730 A1 | 8/2001 | Rhoads |
| 2001/0034705 A1 | 10/2001 | Rhoads et al. |
| 2001/0055407 A1 | 12/2001 | Rhoads |
| 2002/0002675 A1 * | 1/2002 | Bush ............................ 713/160 |
| 2002/0009208 A1 | 1/2002 | Alattar et al. |
| 2002/0034297 A1 | 3/2002 | Rhoads |
| 2002/0036617 A1 | 3/2002 | Pryor |
| 2002/0057383 A1 * | 5/2002 | Iwamura ....................... 348/734 |
| 2002/0075298 A1 | 6/2002 | Schena |
| 2002/0122568 A1 | 9/2002 | Zhao |
| 2002/0131076 A1 | 9/2002 | Davis |
| 2002/0176003 A1 | 11/2002 | Seder et al. |
| 2002/0186886 A1 | 12/2002 | Rhoads |
| 2002/0196272 A1 | 12/2002 | Ramos et al. |
| 2003/0026453 A1 | 2/2003 | Sharma et al. |
| 2003/0040326 A1 | 2/2003 | Levy et al. |
| 2003/0040957 A1 | 2/2003 | Rodriguez et al. |
| 2003/0105730 A1 | 6/2003 | Rhoads et al. |
| 2003/0130954 A1 | 7/2003 | Carr et al. |
| 2004/0005093 A1 | 1/2004 | Rhoads |
| 2004/0022444 A1 | 2/2004 | Rhoads |
| 2004/0128512 A1 | 7/2004 | Sharma et al. |
| 2004/0190750 A1 | 9/2004 | Rodriguez et al. |
| 2004/0240704 A1 | 12/2004 | Reed |
| 2004/0264733 A1 | 12/2004 | Rhoads et al. |
| 2005/0041835 A1 | 2/2005 | Reed et al. |
| 2005/0058318 A1 | 3/2005 | Rhoads |
| 2005/0192933 A1 | 9/2005 | Rhoads et al. |
| 2005/0271246 A1 | 12/2005 | Sharma et al. |
| 2006/0013435 A1 | 1/2006 | Rhoads |
| 2006/0041591 A1 | 2/2006 | Rhoads |
| 2006/0251291 A1 | 11/2006 | Rhoads |
| 2007/0027818 A1 | 2/2007 | Lofgren et al. |
| 2007/0055884 A1 | 3/2007 | Rhoads |
| 2007/0108287 A1 | 5/2007 | Davis et al. |
| 2007/0154064 A1 | 7/2007 | Rhoads et al. |
| 2007/0276841 A1 | 11/2007 | Rhoads et al. |
| 2007/0276928 A1 | 11/2007 | Rhoads et al. |
| 2008/0121728 A1 | 5/2008 | Rodriguez |
| 2008/0125083 A1 | 5/2008 | Rhoads |
| 2008/0133555 A1 | 6/2008 | Rhoads et al. |
| 2008/0215636 A1 | 9/2008 | Lofgren et al. |
| 2008/0292134 A1 | 11/2008 | Sharma et al. |
| 2008/0293381 A1 | 11/2008 | Rhoads |
| 2008/0300011 A1 | 12/2008 | Rhoads et al. |
| 2009/0012944 A1 | 1/2009 | Rodriguez et al. |
| 2009/0116683 A1 | 5/2009 | Rhoads |
| 2009/0116687 A1 | 5/2009 | Rhoads et al. |
| 2009/0125475 A1 | 5/2009 | Rhoads et al. |
| 2009/0232352 A1 | 9/2009 | Carr et al. |
| 2009/0286572 A1 * | 11/2009 | Rhoads et al. ................. 455/557 |
| 2009/0290754 A1 | 11/2009 | Rhoads |
| 2010/0009714 A1 | 1/2010 | Mckinley et al. |
| 2010/0027837 A1 | 2/2010 | Levy et al. |
| 2010/0045816 A1 | 2/2010 | Rhoads |
| 2010/0062819 A1 | 3/2010 | Hannigan et al. |
| 2010/0094639 A1 | 4/2010 | Rhoads |
| 2010/0142749 A1 | 6/2010 | Rhoads et al. |
| 2010/0172540 A1 | 7/2010 | Davis et al. |
| 2010/0198941 A1 | 8/2010 | Rhoads |
| 2010/0293106 A1 | 11/2010 | Rhoads et al. |
| 2010/0296526 A1 | 11/2010 | Rhoads |

| | | |
|---|---|---|
| 2011/0007936 A1 | 1/2011 | Rhoads |
| 2011/0019001 A1 | 1/2011 | Rhoads et al. |
| 2011/0026777 A1 | 2/2011 | Rhoads et al. |
| 2011/0051998 A1 | 3/2011 | Rhoads |
| 2011/0062229 A1 | 3/2011 | Rhoads |
| 2011/0066658 A1 | 3/2011 | Rhoads et al. |
| 2011/0091066 A1 | 4/2011 | Alattar |

FOREIGN PATENT DOCUMENTS

| | | |
|---|---|---|
| JP | 10-254614 | 9/1998 |
| WO | WO 9814863 | 4/1998 |
| WO | WO 0036605 | 6/2000 |

OTHER PUBLICATIONS

U.S. Appl. No. 09/818,533, filed Mar. 28, 2001, Geoffrey B. Rhoads.
U.S. Appl. No. 09/986,170, filed Nov. 7, 2001, Geoffrey B. Rhoads.
U.S. Appl. No. 10/137,124, filed May 1, 2002, Brett T. Hannigan, et al.
U.S. Appl. No. 09/413,117, filed Oct. 6, 1999, Geoffrey B. Rhoads.
U.S. Appl. No. 09/507,096, filed Feb. 17, 2000, Geoffrey B. Rhoads, et al.
U.S. Appl. No. 09/482,749, filed Jan. 13, 2000, Geoffrey B. Rhoads.
U.S. Appl. No. 09/343,104, filed Jun. 29, 1999, Tony F. Rodriguez, et al.
U.S. Appl. No. 09/633,587, filed Aug. 7, 2000, Geoffrey B. Rhoads, et al.
U.S. Appl. No. 09/567,405, filed May 8, 2000, Geoffrey B. Rhoads, et al.
U.S. Appl. No. 09/689,289, filed Oct. 11, 2000, Geoffrey B. Rhoads, et al.
U.S. Appl. No. 09/629,649, filed Aug. 1, 2000, J. Scott Carr, et al.
U.S. Appl. No. 09/552,998, filed Apr. 19, 2000, Tony F. Rodriguez, et al.
U.S. Appl. No. 09/343,101, filed Jun. 29, 1999, Bruce L. Davis, et al.
U.S. Appl. No. 13/084,981, filed Apr. 12, 2011, Geoffrey B. Rhoads.
U.S. Appl. No. 09/697,009, filed Oct. 25, 2000, Bruce L. Davis, et al.
U.S. Appl. No. 09/697,015, filed Oct. 25, 2000, Bruce L Davis, et al.
Azuma, "A Survey of Augmented Reality," Presence: Teleoperators and Virtual Environments 6,4, Aug. 1997, 355-385 pp. 1-48.
Fitzmaurice, "Situated Information Spaces and Spatially Aware Palmtop Computers," Comm. of the ACM, vol. 36, No. 7, pp. 39-49, Jul. 1993.
Fitzmaurice, Virtual Reality for Palmtop Computers, ACM Trans. on Information Systems, vol. 11, No. 3, Jul. 1993, pp. 197-218.
Harrison, "Squeeze Me, Hold Me, Tilt Me! An Exploration of Manipulative User Interfaces," CHI 98, Apr. 1998, pp. 17-24.
Kato et al, "Marker Tracking and HMD Calibration for a Video-Based Augmented Reality Conferencing System," Proc. of IWAR '99, San Francisco, CA, Oct. 20-21, 199910 pages.
Kindberg et al, "People, Places, Things: Web Presence for the Real World," HP Technical Report HPL-2000-16, Feb. 2000, 18 pages.
Mine, Moving Objects in Space: Exploiting Proprioception in Virtual Environment Interaction, Proc. of SIGGRAPH '97, 8 pages.
Rekimoto et al, "Augment-Able Reality: Situated Communication Through Physical and Digital Spaces," 2d Int'l Symp. on Wearable Computers, Oct. 1998, 8 pages.
Rekimoto, "The World through the Computer: Computer Augmented Interaction with Real World Environments," Symposium on User Interface Software and Technology, Nov. 14, 1995.
Rekimoto, "Tilting Operations for Small Screen Interfaces," Proc. of 9th ACM Symp. on User Interface Software and Technology, pp. 167-168, 1996.
Rekimoto, "Matrix: A Realtime Object Identification and Registration Method for Augmented Reality," Proc. of Asia Pacific Computer Human Interaction, pp. 63-68, Jul. 1998.
Schilit et al, "Context-Aware Computing Applications," IEEE Proc. of Workshop on Mobile Computing Systems and Applications, Dec. 1994, pp. 85-90.
Small et al, "Design of Spatially Aware Graspable Displays," Extended Abstracts of CHI '97, 2 pp.
Verplaetse, "Inertial Proprioceptive Devices: Self-motion-sensing toys and tools," IBM Systems Journal, vol. 35, Nos. 3.&4, 1996, pp. 639-650.
Cutler, View-Based Interpretation of Real-Time Optical Flow for Gesture Recognition, Third IEEE Int'l Conf. on Automatic Face and Gesture Recognition, Apr. 1998, pp. 416-421.
Kuzuoka, GestureCam—A Video Communication System for Sympathetic Remote Collaboration, Proc. of 1994 ACM Conf. on Computer Supported Cooperative Work, pp. 35-43.
Ware, Exploration and Virtual Camera Control in Virtual 3D Environments, Proc. of 1990 Symp. on Interactive 3D Graphics, pp. 175-183.
Watanabe, Real Time Recognition of Gesture and Gesture Degree Information Using Multi Input Image Sequence, 14th Int'l Conf. on Pattern Recognition (ICPR'98), p. 1855.

* cited by examiner

GESTURAL TECHNIQUES WITH WIRELESS MOBILE PHONE DEVICES

RELATED APPLICATION DATA

This application is a division of application Ser. No. 09/758,532, filed Jan. 10, 2001 (now U.S. Pat. No. 7,224,995), which is a continuation-in-part of application Ser. No. 09/571,422, filed May 15, 2000 (now U.S. Pat. No. 6,947,571), which claims priority to provisional application 60/163,332, filed Nov. 3, 1999.

FIELD OF THE INVENTION

The present invention relates to wireless mobile phone devices, and their methods of use.

BACKGROUND

In copending application Ser. No. 09/343,104 (filed Jun. 29, 1999, a continuation of which has been published as US20050013462), and Ser. No. 09/292,569 (filed Apr. 15, 1999, a continuation of which has been published as US20030219144), the present assignee details a variety of novel communications and control technologies. The present specification builds on those earlier applications, detailing additional novel technologies and systems.

Figure 1:
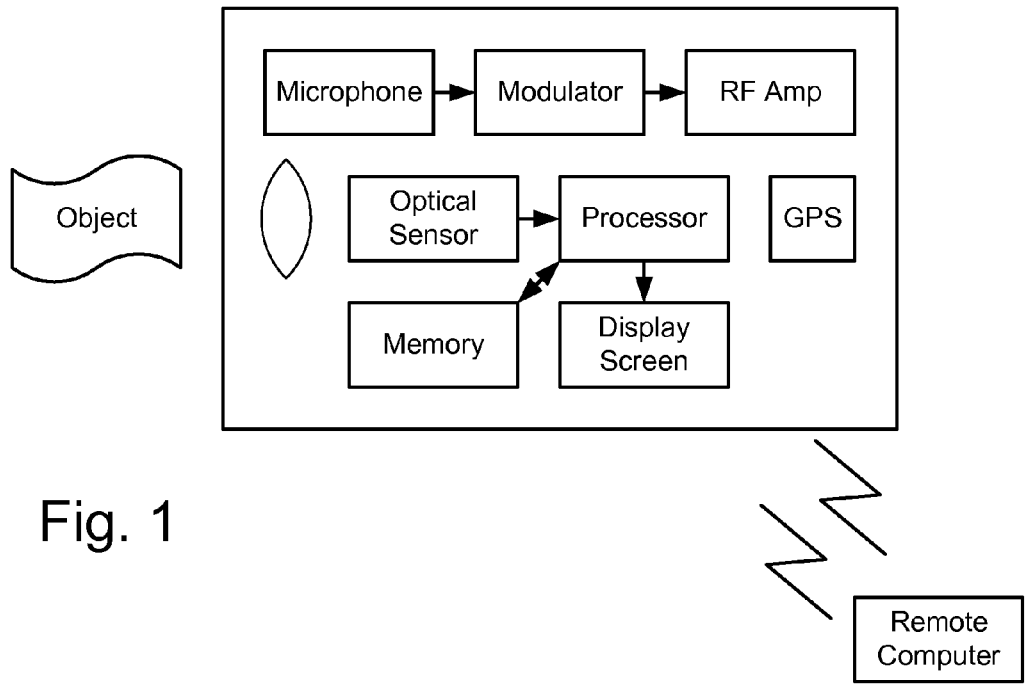
FIG. 1 is a block diagram of a system employing some of the technology detailed herein.

DETAILED DESCRIPTION (The presently claimed technology comprises just a subset of the technology detailed in this application and the other applications/patents that are incorporated herein by reference.)

The cited '104 application details a variety of optical input devices, including some in which the optical sensor element and "Bedoop" (now known as Digimarc MediaBridge) decoding circuitry are integrated on a common substrate. A variety of other novel input devices can also be used.

One is a mouse-like peripheral that includes an optical sensing system. The optical sensing system can comprise a 1D array of plural optical sensors (e.g., CCD, CMOS, etc.), or a 2D array. Such devices are already known in other contexts, e.g., the Microsoft IntelliMouse with IntelliEye technology. That device includes a multi-element CMOS optical sensor integrated on an IC with various detector and processing circuitry, operating in conjunction with a short focal length imaging lens and an LED illumination source. The circuitry tracks movement of patterns across the sensor's field of view, by which the mouse's movement can be deduced. The Microsoft product collects 1500 data sets per second—a rate much higher than is needed in most embodiments of the assignee's Bedoop technology.

Such a mouse-like peripheral can omit the buttons and position-sensing features commonly provided on traditional mice, yielding a simple desk-facing palm camera that generates frames of data corresponding to a small area under the sensor portion of the mouse. More typically, however, the peripheral includes the buttons, roller wheels, and/or X-/Y-position sensing arrangements of traditional mice so that button and positional forms of data input can be exploited in interacting with the Bedoop application.

The optical data collected by the sensor can be processed within the peripheral's processor to extract the steganographically encoded binary Bedoop data therefrom. Or this processing burden can be undertaken by the associated computer system, with the peripheral simply processing and formatting the raw sensor data into sequential frames of image data to be output to that system.

Any form of hand-held scanner—whether of the type just described or others known in the art—offers a convenient way to interact with catalog advertising. Imagine a traditional paper catalog, e.g., from L.L. Bean, Inc., or Lands End. Each image in the catalog is Bedoop-encoded with a code that identifies the depicted product. A user browsing through the catalog, on seeing a product of interest, places the scanner over the picture (and optionally may be required to push a button or otherwise signal to initiate further processing). The scanner detects the Bedoop data and relays it to an associated computer (optionally with data identifying the consumer). The computer polls a remote server computer maintained by the merchant, which responds with data corresponding to the item depicted in the scanned image. This returned data can include data indicating the sizes available, data indicating the colors available, data indicating the variant styles available, flag bits indicating whether each item is in stock, etc. This returned data can be presented to the consumer—typically on a display device but alternatively in audible form.

Preferably, the customer's body measurements (waist size, inseam length, neck size, etc.) are stored in a user profile, either on the local computer or at the merchant's server computer. This allows the system to customize the data presented to the user—e.g., showing the color options and availability only for the depicted shirt in a 16 inch neck and a 34 inch sleeve length.

If necessary, the user can select among the color or style options, using the handheld input device (either buttons, gestures, etc.), or any other input device. Or the item may be one for which no further specifications are needed. In either event, once the desired product has been sufficiently specified, the user can signal the system to place the order. Payment and shipping details can be arranged through any of the great variety of techniques known in the art, e.g., by charging to a credit card number and shipping to an address on-file with the merchant (as detailed, e.g., in U.S. Pat. No. 5,960,411).

While scanning peripherals of the type described above are typically wired to an associated host system, wireless links (e.g., radio, infrared, ultrasonic, etc.) can of course be used, freeing the user from the constraint imposed by the cable.

One of the embodiments detailed in the earlier applications is a pay telephone with a Bedoop sensor. The technology can likewise be integrated into cellular phones, of the type available from Motorola, Nokia, Qualcomm, and others, and reviewed in applicant's allowed application Ser. No. 09/172,324 (now U.S. Pat. No. 6,064,737). Such a phone can be equipped with a 1D or 2D image sensor, the output of which is applied to Bedoop decoding circuitry within the phone. This decoding circuitry can be the phone's main CPU, or can be a processing circuit dedicated to Bedoop functionality. (As noted elsewhere, the decoding can be effected by dedicated hardware, by decoding software executing on a general purpose CPU, etc.)

Cell phones are already equipped with numerous features that make them well suited for Bedoop operation. One is that cell phones typically include an LCD or similar screen for display of textual or graphic information, and additionally include buttons or other controls for selecting among menu options presented on the screen (e.g., by moving a cursor. Moreover, cell phones naturally include both audio input and output devices (i.e., microphone and speaker). Still further, the protocol by which cell phones transmit data includes data identifying the phone, so that such data need not be separately encoded. And finally, cell phones obviously provide ready links to remote computer systems. Collectively, these capabilities rival those of the most fully-equipped desktop computer system. Thus, essentially all of the applications detailed in the prior applications can be implemented using cell phone Bedoop systems.

As with the other Bedoop systems, when Bedoop data is sensed, the phone can respond to the data locally, or it can forward same over the cellular network to a remote system (or computer network) for handling.

One application that may be invoked locally (i.e., within the phone) is the dialing of a corresponding telephone number (as detailed, e.g., in the above-cited applications). In some embodiments, the phone number is literally encoded as part of the Bedoop data payload. In others, the phone number is stored in a memory within the phone, and indexed in accordance with an identifier decoded from the Bedoop data.

The variety of operations that can be handled remotely is virtually limitless. Some entail interaction with the user. For example, the remote system may initially respond by presenting to the user a menu of options on the display screen (e.g., Purchase, Add to Shopping List, Request Sample, Add to Notepad, etc.) The user then responds by providing further input (e.g., by manipulating one or more buttons on the phone, by providing spoken instructions to a voice recognition sub-system within the phone, etc.). This further data is then dispatched from the phone, and the requested action undertaken. Other operations don't require further interaction with the user, but immediately invoke a corresponding action.

In this and other contexts, it will be recognized that the gestural input concepts detailed in the prior applications involve relative movement between the sensor and the encoded object. In most of the earlier examples, the sensor is stationary, so gesticulation is effected by moving the object. Naturally, if the sensor is moveable (e.g., as a cell phone), the gestural movement can be effected by moving the sensor instead.

In the earlier-filed applications, the user can solicit different responses by moving the object relative to the sensor. In other embodiments, different responses can be solicited without movement, e.g., by presenting the object at different orientations.

Consider a magazine advertisement. When presented to the sensor with the top of the page up, a first response can be invoked. If the page is presented at a rotation of 90 degrees, a second response can be invoked. Similarly with 180 degrees rotation (i.e., upside down), and 270 degrees rotation. The Bedoop detector can detect these different rotational states by reference to attributes of the watermark signal discerned from the magazine page (e.g., by reference to the rotation state discerned from the subliminal grid signal detailed in applicant's prior patents).

While the just-described arrangement included the Bedoop decoding function within the phone, in other embodiments the image data can be transmitted from the phone and decoded at a remote location.

In the earlier-filed applications, reference was made to GPS receivers as permitting the location of a person to be tracked, and contact information updated accordingly. GPS receivers find many other applications in Bedoop contexts. For example, the response of a Bedoop system can be tailored, or vary, in accordance with the location of the person invoking the operation. To illustrate, if a user presents a newspaper insert or coupon for a Dominos pepperoni pizza meal to the Bedoop sensor on a GPS-equipped cellular phone, the GPS data can be encoded in the Bedoop data dispatched to the Domino's Bedoop server. That server can identify, by reference to the GPS data, the location of the nearest Domino's franchise, and can forward the order to that franchisee. The franchisee, in turn, can telephone the user (by reference to telephone number data from the cell phone) to confirm the order, inquire if additional items are desired, inform the user of the final price, and to obtain the delivery address. (The latter step can be omitted; the franchisee can employ the GPS data to obtain the corresponding street address, e.g., from map data licensed through NavTech of Chicago.)

The protocols by which the Bedoop data, GPS data, and cell phone identification data are conveyed from the phone to the cellular network can take various forms; the design of such systems are familiar to those in the relevant arts. In one embodiment, the protocols by which some cell phones are now provided with email or internet access are further adapted to convey Bedoop and GPS data. The protocols for conveying telephone identification data are already well established. Once received by the cellular network, the Bedoop data can be formatted into packets, either incorporating the GPS data and telephone data into the same packet structure, or by formatting such data into separate packets accompanying the Bedoop packets.

The provision of image sensors in cell phones enables other functionality. One is the capture of still or video imagery. Such image data can be compressed (typically by lossy processes such as MPEG, JPEG, or the like, implemented with dedicated hardware CODECs) and transmitted with the audio data. The screens on such phones can likewise be used for display of incoming image or video data.

Another function enabled by image sensors in cell phones is user-verification, e.g., by retinal scanning or other optically-sensed biometrics, before the phone will permit a call to be placed. A great number of such biometric verification techniques are known.

Cell phone Bedoop sensors may not always be in communication with the cell phone network. The phone may be out of range of a cell site, or may be in operational mode in which an RF link is not then established. In such events, any Bedoop data sensed by the phone that is to be handled remotely is desirably stored locally within the phone, and queued for transmission to the cellular network the next time communication is established (a so-called "store and forward" form of operation).

Figure 2:
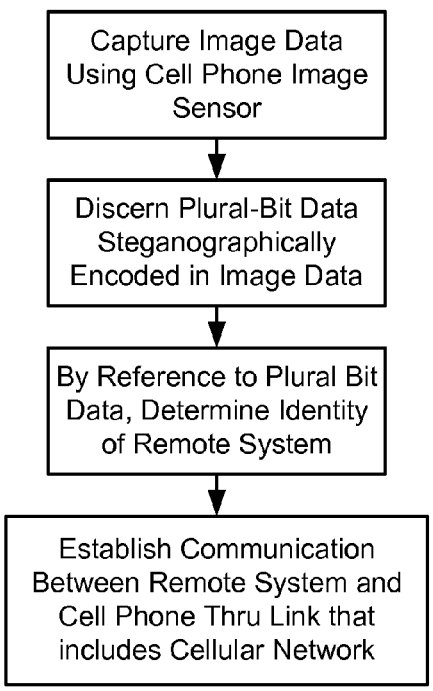
FIG. 2 is a flow chart of a method employing some of the technology detailed herein.

Certain of the foregoing arrangements are depicted in FIGS. 1 and 2.

Tatoos

Wholly unrelated to the foregoing is the notion of a Bedoop-encoded tattoo. Temporary tattoos are well known and typically include an ink or printed film that is transferred to a wearer's skin through some application process (e.g., wetting or otherwise). The artwork on the tattoo can be arranged to steganographically encode Bedoop data.

E-Paper

While the prior applications noted that a great variety of printing technologies can be employed in Bedoop applications, it should be noted that e-paper can be employed as well. E-paper, developed by Nicholas K. Sheridon of Xerox, and mass produced by 3M, is a thin layer of transparent plastic in which millions of small beads, somewhat like toner particles, are dispersed. The beads, each contained in a fluid-filled cavity, are free to rotate within those cavities. The beads are "bichromal," with hemispheres of contrasting color (e.g.

black and white). Under the influence of a voltage applied to the surface of the sheet, the beads rotate to present one colored side or the other to the viewer. A pattern of voltages can be applied to the surface in a bit-wise fashion to create images such as text and pictures. The image persists until new voltage patterns are applied to create new images. The reader is presumed familiar with the US patents issued to Sheridon on this technology.

It will further be recognized that epaper can be used to convey digital data according to essentially any known watermarking method, including those detailed in the patents and applications incorporated by reference, and is also suitable for conveying digital information in data glyph form.

Revenue Sharing

When a consumer presents a Bedoop-encoded object to a sensor, and as a result of the link(s) thereby established, purchases a product or service, the revenue from that transaction may be shared with the participants who made it possible. In the case of a Bedoop-encoded magazine ad, some of the participants may include (1) the photographer or graphic designer who produced artwork used in the ad; (2) the advertising agency whose creative talent led to the ad; (3) the publisher of the magazine in which the consumer encountered the ad; (4) the service provider(s) who provided the transport channel(s) between the consumer and the vendor; and (5) the service provider who maintained the server that ultimately linked the Bedoop data to the vendor's web site.

Building Access

Another use of the Bedoop technology detailed in the '104 application (and other applications and patents of the present assignee) is to control building access (or facility access, or room access, etc.) access through a combination of an ID card, Bedoop technology, and proximity detection technology.

The ID card can be a badge or the like having a steganographically-encoded photograph of the bearer. The card further includes a proximity ID device, such as an unpowered electronic circuit that is excited and detected by a radiant field from an associated proximity detector, providing a unique signature identifying a particular individual.

The building can be provided with an image sensor, such as a video camera or the like, an associated Bedoop detection system, and the proximity detector. When a user wearing the badge approaches, the proximity detector signals the camera to capture image data. The Bedoop detection system identifies the badge photograph as conveying Bedoop data (e.g., by clues as are described in the prior applications, or without such aids), and decodes same. The access control system then checks whether the badge ID discerned from the proximity sensor properly corresponds to the Bedoop data extracted from the photograph on the badge. If so, access is granted; if not, the data is logged and an alarm is sounded.

By such arrangement, premises security is increased. No longer can proximity-based access badges be altered to substitute the picture of a different individual. If the photo is swapped, the proximity system ID and the embedded photo data will not match, flagging an unauthorized attempted access.

The same principles are applicable in many other contexts—not limited to RF-based proximity detection systems. For example, the data decoded from the photograph can be compared against other forms of machine-sensed personal identification. These include, but are not limited to, bar code IDs, mag-stripe ID cards, smart cards, etc.

As known from the prior applications, there are a great number of techniques by which the encoding of Bedoop digital data can be performed. The present assignee's prior application Ser. No. 09/127,502 (filed Jul. 31, 1998, now U.S. Pat. No. 6,345,104), for example, shows techniques by which very fine lines can be printed on a medium to slightly change the medium's apparent tint, while also conveying digital data. Commonly-owned application Ser. No. 09/074,034, filed May 6, 1998, (now U.S. Pat. No. 6,449,377) details how the contours of printed imagery can be adjusted to convey digital data. (That technique can be applied to printed text characters, as well as the line art imagery particularly considered.) The assignee's U.S. Pat. No. 5,850,481 details how the surface of paper or other media can be textured to convey optically-detectable binary data. The assignee's U.S. Pat. Nos. 5,841,886, 5,809,160 and 5,862,260 detail various techniques for steganographically encoding photographs and other imagery.

Some watermarking techniques are based on changes made in the spatial domain; others are based on changes made in transformed domains (e.g., DCT, wavelet). One example of the latter is shown in U.S. Pat. No. 5,930,369. Watermarking of printed text can be achieved by slight variations to character shape, character kerning, line spacing, etc.

Data glyph technology, as detailed in various patents to Xerox, is usable in many of the applications detailed herein. Bar codes, too, may also be used.

The foregoing is just a gross under-sampling of the large number of watermarking techniques. The artisan is presumed to be familiar with such art, all of which is generally suitable for use in the applications detailed herein.

To provide a comprehensive disclosure without unduly lengthening this specification, applicant incorporates by reference the patents and applications cited above, except Ser. No. 09/571,422.

Having described and illustrated the principles of our work with reference to specific embodiments, it will be recognized that the principles thereof can be implemented in many other, different, forms. Moreover, the particular combinations of elements and features in the above-detailed embodiments are exemplary only; the interchanging and substitution of these teachings with teachings in the incorporated-by-reference applications are also contemplated.

We claim:

1. A wireless mobile phone device comprising
a processor configured to:
  execute a user interface that is responsive to motion of the device, wherein the wireless mobile phone device is configured to receive user input based at least in part on a corresponding movement of the wireless mobile phone device
  execute a program;
  execute an application programming interface (API) comprising plural functions, wherein the API allows the program to issue queries soliciting wireless mobile phone device movement data;
  sense a digital watermark in each frame of plural frames of image data; and
  generate movement data by tracking movement of the digital watermark in the plural frames of image data, wherein the movement data is accessible by the API.

2. The wireless mobile phone device of claim 1, further comprising a 2D image sensor configured to provide the plural frames of image data.

3. The wireless mobile phone device of claim 1, wherein at least one API function queries for data indicating movement of the wireless mobile phone device to the left or right.

4. The wireless mobile phone device of claim 1, wherein at least one API function queries for data indicating movement of the wireless mobile phone device forward or backward.

5. The wireless mobile phone device of claim 1, wherein at least one API function queries for data indicating movement of the wireless mobile phone device in a rotational state.

6. The wireless mobile phone device of claim 1, wherein at least one API function queries for data indicating movement of the wireless mobile phone device in plural directions including: left/right; forward/backward; and rotational state.

7. A wireless mobile phone device comprising:
a processor configured to:
  execute a program;
  execute an application program interface (API), wherein the API enables the program to issue queries soliciting wireless mobile phone device gestural data; and
  generate gestural data by tracking movement of a feature in plural frames of image data, wherein the gestural data is accessible by the API, wherein at least one API function queries for data indicating movement of the wireless mobile phone device in a rotational state, and wherein the data indicating movement is derived from the gestural data.

8. The wireless mobile phone device of claim 7, wherein the API allows the program to solicit current movement data.

9. The wireless mobile phone device of claim 7 wherein the API comprises a first function that solicits a running set of movement data, and a complementary function that discontinues the first function.

10. The wireless phone device of claim 7, further comprising a 2D image sensor configured to provide plural frames of image data.

11. The wireless mobile phone device of claim 1, wherein the user interface is adapted to receive commands signaled to the mobile phone device by a user's corresponding movement of the device.

* * * * *

UNITED STATES PATENT AND TRADEMARK OFFICE
CERTIFICATE OF CORRECTION

PATENT NO. : 8,391,851 B2  
APPLICATION NO. : 11/754126  
DATED : March 5, 2013  
INVENTOR(S) : Rhoads et al.

Page 1 of 1

It is certified that error appears in the above-identified patent and that said Letters Patent is hereby corrected as shown below:

On the Title Page, "Related U.S. Application Data", Line 1, delete Item "(60)" and insert Item -- (62) --, therefor.

On Title Page 4, Item (56), under "OTHER PUBLICATIONS", in Column 2, Line 5, delete "199910" and insert -- 1999, 10 --, therefor.

In the Claims

In Column 6, Line 42, in Claim 1, delete "comprising" and insert -- comprising: --, therefor.

In Column 6, Line 48, in Claim 1, delete "device" and insert -- device; --, therefor.

In Column 8, Line 6, in Claim 9, delete "7" and insert -- 7, --, therefor.

In Column 8, Line 10, in Claim 10, delete "wireless phone" and insert -- wireless mobile phone --, therefor.

Signed and Sealed this
Eighteenth Day of March, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,391,851 B2 | Page 1 of 1 |
| APPLICATION NO. | : 11/754126 | |
| DATED | : March 5, 2013 | |
| INVENTOR(S) | : Rhoads et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1363 days.

Signed and Sealed this

Second Day of December, 2014

Michelle K. Lee
*Deputy Director of the United States Patent and Trademark Office*